US008327209B2

(12) United States Patent
Ito et al.

(10) Patent No.: US 8,327,209 B2
(45) Date of Patent: Dec. 4, 2012

(54) SOUND DATA DECODING APPARATUS

(75) Inventors: Hironori Ito, Tokyo (JP); Kazunori Ozawa, Tokyo (JP)

(73) Assignee: NEC Corporation, Tokyo (JP)

( * ) Notice: Subject to any disclaimer, the term of this patent is extended or adjusted under 35 U.S.C. 154(b) by 799 days.

(21) Appl. No.: 12/309,597

(22) PCT Filed: Jul. 23, 2007

(86) PCT No.: PCT/JP2007/064421

§ 371 (c)(1), (2), (4) Date: Mar. 20, 2009

(87) PCT Pub. No.: WO2008/013135

PCT Pub. Date: Jan. 31, 2008

(65) Prior Publication Data

US 2010/0005362 A1 Jan. 7, 2010

(30) Foreign Application Priority Data

Jul. 27, 2006 (JP) ................................ 2006-204781

(51) Int. Cl.
*G01L 19/14* (2006.01)

(52) U.S. Cl. ....................................... 714/747; 704/228

(58) Field of Classification Search .................. 714/746, 714/747; 704/228

See application file for complete search history.

(56) References Cited

U.S. PATENT DOCUMENTS

| | | | | |
|---|---|---|---|---|
| 5,873,058 | A | 2/1999 | Yajima et al. | |
| 6,351,635 | B1 | 2/2002 | Ohsuge | |
| 6,952,668 | B1 * | 10/2005 | Kapilow | 704/206 |
| 7,359,409 | B2 * | 4/2008 | Li | 370/516 |
| 7,411,985 | B2 * | 8/2008 | Lee et al. | 370/352 |
| 7,596,489 | B2 * | 9/2009 | Kovesi et al. | 704/219 |
| 7,930,176 | B2 * | 4/2011 | Chen | 704/228 |
| 2002/0169859 | A1 | 11/2002 | Serizawa | |
| 2005/0058145 | A1 * | 3/2005 | Florencio et al. | 370/412 |

FOREIGN PATENT DOCUMENTS

| | | |
|---|---|---|
| JP | 02-023744 | 1/1990 |
| JP | 08-008933 | 1/1996 |
| JP | 8-110798 A | 4/1996 |
| JP | 09-321783 | 12/1997 |
| JP | 11-150602 A | 6/1999 |
| JP | 11-305797 | 11/1999 |

(Continued)

OTHER PUBLICATIONS

T. Morinaga et al., "Robust speech coding under packets loss condition for Broad-band IP network," Proceedings of the 2001 IEICE General Conference Tsushin 2, Mar. 7, 2001, p. 377.

(Continued)

*Primary Examiner* — Stephen M Baker
(74) *Attorney, Agent, or Firm* — Foley & Lardner LLP

(57) ABSTRACT

A sound data decoding apparatus based on a waveform coding method includes a loss detector, sound data decoder, sound data analyzer, parameter modifying section and sound synthesizing section. The loss detector detects whether a loss exists in a sound data. The sound data decoder decodes the sound data to generate a first decoded sound signal. The sound data analyzer extracts a first parameter from the first decoded sound signal. The parameter modifying section modifies the first parameter based on a result of the detection of loss. The sound synthesizing section generates a first synthesized sound signal by using the modified first parameter. Thus, a deterioration of sound quality is prevented in the error compensation of sound data.

12 Claims, 10 Drawing Sheets

FOREIGN PATENT DOCUMENTS

| | | | |
|---|---|---|---|
| JP | 2001-177481 | A | 6/2001 |
| JP | 2002-268697 | A | 9/2002 |
| JP | 2005-77889 | A | 3/2005 |
| JP | 2005-274917 | A | 10/2005 |
| KR | 0462024 | B1 | 12/2004 |

OTHER PUBLICATIONS

M. Serizawa et al., "A Filter Memory Recovery Method Using Delayed Packets in CELP Decoders," The Institute of Electronics, Information and Communication Engineers 2001 Nen Information and System Society Takai Koen Ronbunshu, Aug. 29, 2001, p. 234.

Emre Gündüzhan et al., A Linear Prediction Based Packet Loss Concealment Algorithm for PCM 1 Coded Speech, IEEE Transactions on Speech and Audio Processing, vol. 9, No. 8, Nov. 2001, 8 , pages.

Kazuhiro Kondo et al., "On Packet Loss Concealment Using Linear Prediction," Proc. Of 2003 Autumn Meeting of Acoustical Society of Japan, Sep. 17, 2003, pp. 187-188.

Keiichi Funaki et al., On an Improvement for G.711 PLC Method, The 2004 Autumn Meeting of the Acoustical Society of Japan, Sep. 2004, pp. 383-384.

* cited by examiner

SOUND DATA DECODING APPARATUS

This application is the National Phase of PCT/JP2007/064421, filed Jul. 23, 2007, which claims priority to Japanese Application No. 2006-204781, filed Jul. 27, 2006, the disclosures of which are hereby incorporated by reference in their entirety.

TECHNICAL FIELD

The present invention relates to a sound data decoding apparatus, sound data converting apparatus, and error compensating method.

BACKGROUND ART

In a transmission of a sound data through a circuit switching network or packet network, a coding and decoding are executed to transmit and to receive a sound signal. As a sound compression method, for example, an ITU-T (International Telecommunication Union Telecommunication Standardization Sector) recommendation G.711 method and a CELP (Code-Excited Linear Prediction) method have been known.

When a sound data coded based on such a compression method is transmitted, in some case, a portion of the sound data can be lost due to an error relevant to radio communication or due to congestion of the network. As for error compensation for the lost portion, a sound signal corresponding to the lost portion is generated based on information of the preceding portion of the sound data to the lost portion.

In such error compensation, sound quality may degrade. Japanese Laid Open Patent Application (JP-P2002-268697A) discloses a method to reduce the degradation of sound quality. In the method, a filter memory value is updated by using sound frame data included in a packet received at late timing. In other words, when the packet of loss is received at late timing, the sound frame data included in the packet is used for updating the filter memory value which is used by a pitch filter or a filter representing outline of spectrum.

Japanese Laid Open Patent Application (JP-P2005-274917A) discloses art relevant to ADPCM (Adaptive Differential Pulse Code Modulation) coding. The art can solve a problem that mismatch between the states of predictors of coding side and decoding side causes unpleasant noise. The problem may occur in case that correct coded data is received after the loss of coded data. In a predetermined duration after transition of the state of packet loss from “detect” to “not detect”, a detection state controlling section gradually reduces an intensity of compensation signal generated based on sound data of the past. Since the states of the predictors gradually match and sound signal gradually become normal in the course of time, the intensity of the sound signal is permitted to increase gradually. Consequently, the art can take an effect that the unpleasant nose is not outputted even just after restoration from the loss state of coded data.

Japanese Laid Open Patent Application (JP-A-Heisei, 11-305797) discloses a method in which a linear prediction coefficient is calculated from a sound signal and a sound signal is generated based on the linear prediction coefficient.

DISCLOSURE OF INVENTION

There is a room for improving sound quality in error compensating methods, in which the past sound waveform is simply repeated, although the above art are disclosed.

An exemplary object of the invention is to compensate an error in a sound data while preventing a degradation of sound quality.

A sound data decoding apparatus based on a waveform coding method includes a loss detector, sound data decoder, sound data analyzer, parameter modifying section and sound synthesizing section. The loss detector is configured to detect whether a loss exists in a sound data. The sound data decoder is configured to decode the sound data to generate a first decoded sound signal. The sound data analyzer is configured to extract a first parameter from the first decoded sound signal. The parameter modifying section is configured to modify the first parameter based on a result of the detection of loss. The sound synthesizing section is configured to generate a first synthesized sound signal by using the modified first parameter.

According to the present invention, an error in a sound data is compensated while preventing a degradation of sound quality.

BEST MODE FOR CARRYING OUT THE INVENTION

Exemplary embodiments of the present invention will be described with reference to the attached drawings. The present invention is not limited to the exemplary embodiments.

A first exemplary embodiment of the present invention will be described below with reference to FIGS. 1 and 2.

Figure 1:
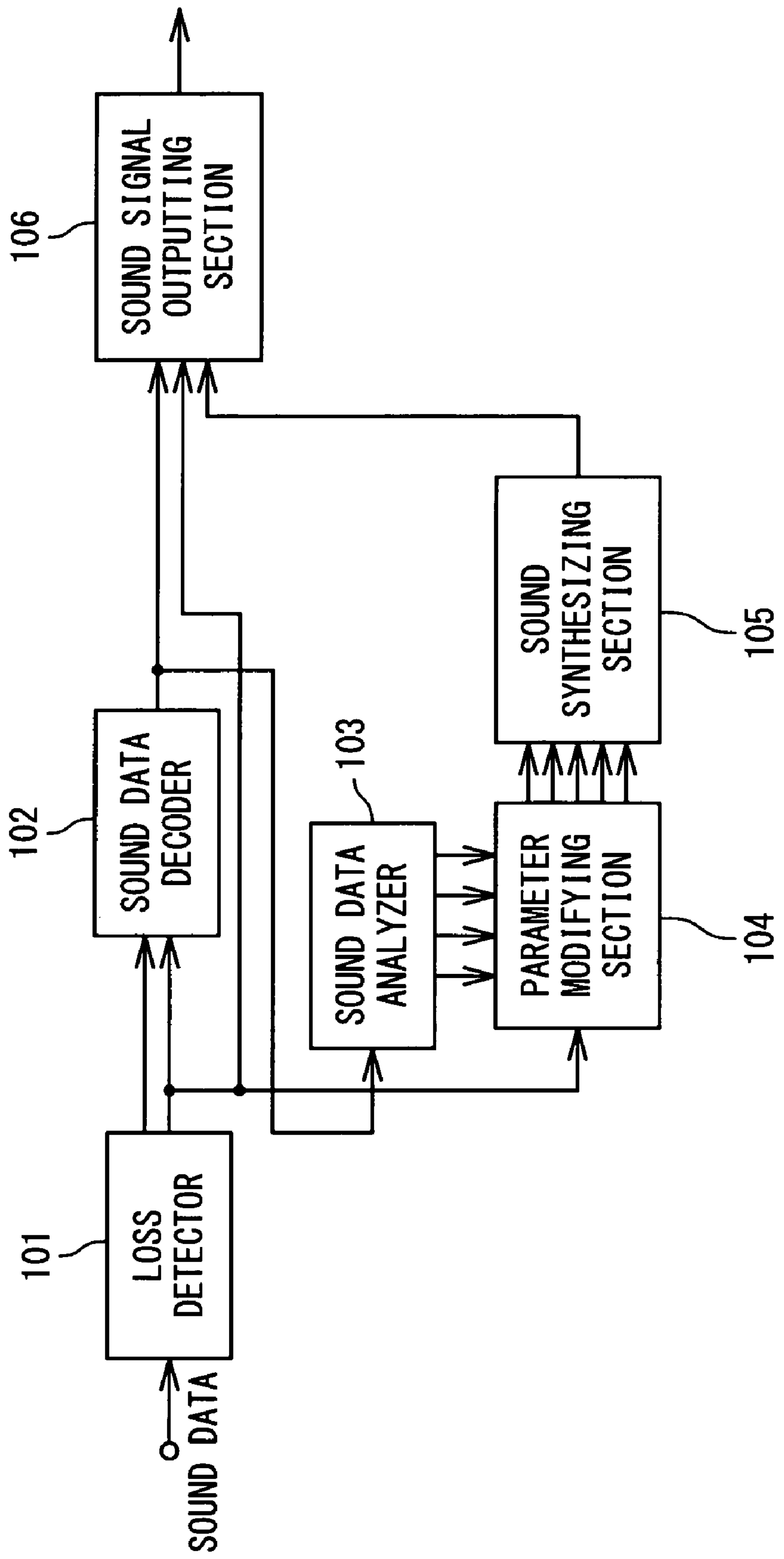
FIG. 1 is a schematic diagram showing a configuration of a sound data decoding apparatus according to a first exemplary embodiment of the present invention.
Figure 2:
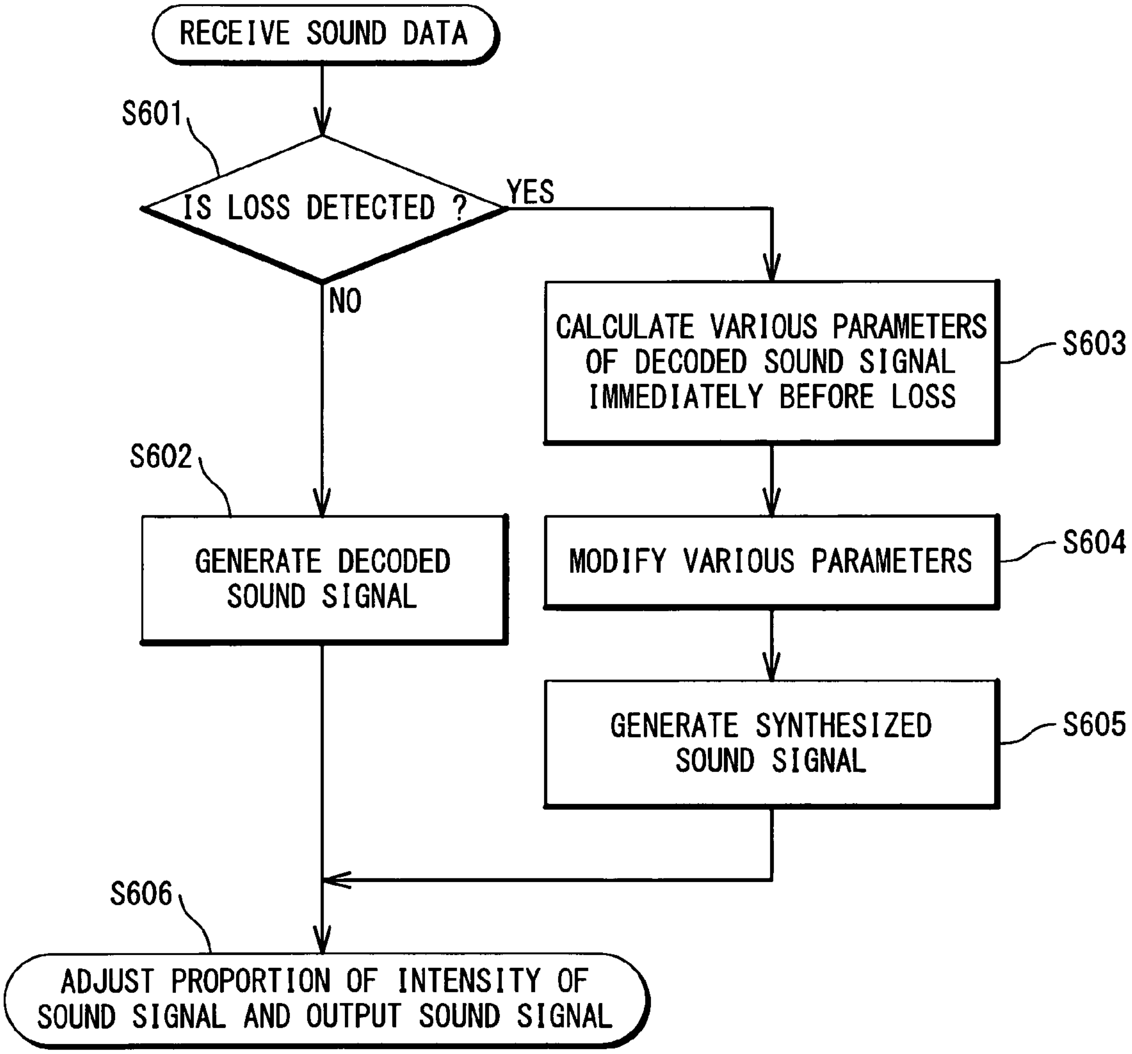
FIG. 2 is a flow chart showing an operation of the sound data decoding apparatus according to the first exemplary embodiment.

FIG. 1 shows a configuration of a sound data decoding apparatus for sound data coded based on a waveform coding method such as the G.711 method. The sound data decoding apparatus according to the first exemplary embodiment includes a loss detector 101, sound data decoder 102, sound data analyzer 103, parameter modifying section 104, sound synthesizing section 105 and sound signal outputting section 106. The sound data means a data which is generated through coding a series of sound, and means a data of sound, in which at least one sound frame is included.

The loss detector 101 outputs a received sound data to the sound data decoder 102. The loss detector 101 detects whether a loss exists in the received sound data and outputs the loss detection result to the sound data decoder 102, parameter modifying section 104 and sound signal outputting section 106.

The sound data decoder 102 decodes the sound data outputted from the loss detector 101 and outputs the decoded sound signal to the sound data outputting section 106 and sound data analyzer 103.

The sound data analyzer 103 divides the decoded sound signal into frames to extract a spectral parameter by performing a linear prediction analysis on the divided signal. The length of each frame is, for example, 20 ms. The spectral parameter represents spectral characteristics of the sound signal. Next, the sound data analyzer 103 divides each of the divided sound signal into sub-frames and extracts a delay parameter and adaptive codebook gain as parameters of adaptive codebook from each of the sub-frames based on a past sound source signal. The length of each sub-frame is, for example, 5 ms. The delay parameter corresponds to pitch cycle. The sound data analyzer 103 executes pitch prediction to predict a sound signal of the sub-frame, which has a higher correspondence to the adaptive codebook. The sound data analyzer 103 normalize a residual signal obtained by the pitch prediction to extract a normalized residual signal and normalized residual signal gain. The sound data analyzer 103 outputs the spectral parameter, delay parameter, adaptive codebook gain, normalized residual signal and normalized residual signal gain (these may be referred to as parameters) to the parameter modifying section 104. It is preferable that the sound data analyzer 103 extracts two or more of the spectral parameter, delay parameter, adaptive codebook gain, normalized residual signal and normalized residual signal gain.

The parameter modifying section 104 modifies the spectral parameter, delay parameter, adaptive codebook gain, normalized residual signal or normalized residual signal gain outputted from the sound data analyzer 103 or does not modifies them based on the loss detection result outputted from the loss detector 101. In the modification, for example, a random number within ±1% of the parameter is added to the parameter or the gain is reduced. The parameter modifying section 104 outputs the modified or not-modified values to the sound synthesizing section 105. The modification of the values avoids the generation of unnatural sound signal in which a pattern is repeated.

The sound synthesizing section 105 generates a synthesized sound signal by using the spectral parameter, delay parameter, adaptive codebook gain, normalized residual signal or normalized residual signal gain outputted from the parameter modifying section 104 and outputs the synthesized sound signal to the sound signal outputting section 106.

The sound signal outputting section 106, based on the loss detection result outputted from the loss detector 101, outputs the decoded sound signal outputted from the sound data decoder 102, the synthesized sound signal outputted from the sound synthesizing section 105 or a signal in which the decoded sound signal and the synthesized sound signal are mixed in a predetermined proportion.

Next, an operation of the sound data decoding apparatus according to the first exemplary embodiment will be described with reference to FIG. 2.

At first, the loss detector 101 detects whether a loss exists in the received sound data (Step S601). The loss detector 101 can use a detecting method in which the existence of loss in the sound data is detected when a bit error generated during the transmission of the sound data through a wireless network is detected by using CRC (Cyclic Redundancy Check) code or a detecting method in which the existence of loss in the sound data is detected when a loss induced during transmission of the sound data through an IP (Internet Protocol) network is detected based on the absence of sequence number in the header of RFC3550RTP (A Transport Protocol for Real-Time Applications).

When the loss detector 101 does not detect any loss in the sound data, the sound data analyzer 103 decodes the received sound data and outputs the result to the sound signal outputting section 106 (Step S602).

When the loss detector 101 detects the loss in the sound data, the sound data analyzer 103 extracts the spectral parameter, delay parameter, adaptive codebook gain, normalized residual signal or normalized residual signal gain based on the decoded sound signal corresponding to a portion of the sound data immediately before the loss (Step S603). The analysis of decoded sound signal can be executed on the decoded sound signal corresponding to the portion of the sound data immediately before the detected loss or the all decoded sound signals. The parameter modifying section 104 modifies the spectral parameter, delay parameter, adaptive codebook gain, normalized residual signal or normalized residual signal gain or does not modify them based on the loss detection result (Step S604). In the modification, for example, the random number within ±1% of the parameter is added to the parameter. The sound synthesizing section 105 generates the synthesized sound signal by using these values (Step S605).

The sound signal outputting section 106, based on the loss detection result, outputs the decoded sound signal outputted from the sound data decoder 102, the synthesized sound signal outputted from the sound synthesizing section 105 or the signal in which the decoded sound signal and synthesized sound signal are mixed in the predetermined proportion (Step S606). More specifically, in case that the loss is detected for neither preceding frame nor present frame, the sound signal outputting section 106 outputs the decoded sound signal. In case that the loss is detected, the sound signal outputting section 106 outputs the synthesized sound signal. In case of the next frame to the detected loss, the synthesized sound signal and decoded sound signal are added such that the proportion of the synthesized sound signal is high at first and the proportion of the decoded sound signal gradually increases in the course of time. This avoids the discontinuity in the sound signal outputted from the sound signal outputting section 106.

The sound data decoding apparatus according to the first exemplary embodiment extracts the parameters, uses these values for the signal to interpolate the loss in the sound data, and thus improves the sound quality of the sound which interpolates the loss. Conventionally the parameters are not extracted in the G.711 method.

A second exemplary embodiment will be described with respect to FIGS. 3 and 4. In the second exemplary embodiment, when the loss in the sound data is detected, the reception of the next sound data following the loss is detected before the output of the sound signal to interpolate the loss, in contrast to the first exemplary embodiment. When the next sound data is detected, in addition to the operation of the first exemplary embodiment, the information of the next sound data is used to generate the sound signal corresponding to the sound data with the loss.

Figure 3:
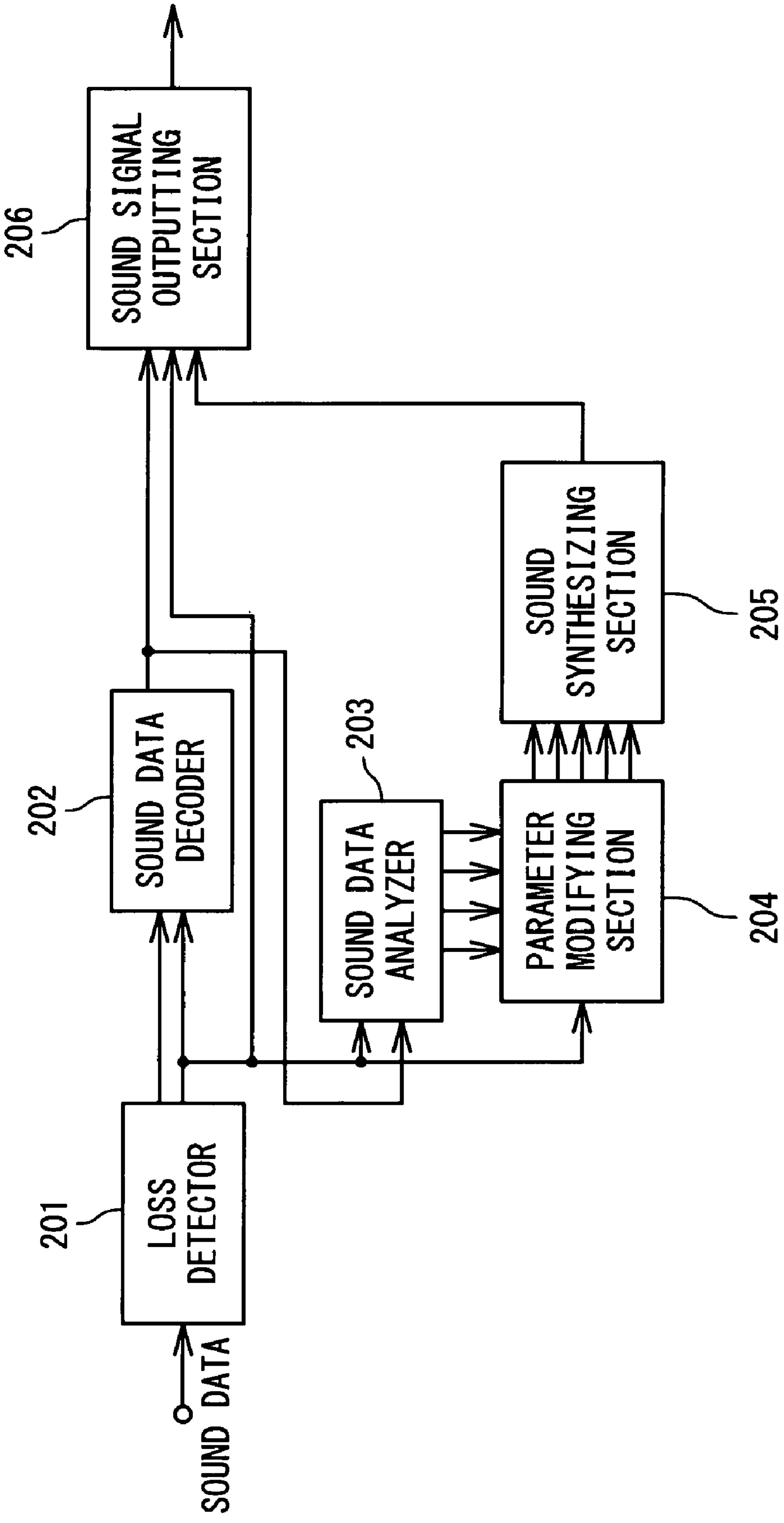
FIG. 3 is a schematic diagram showing a configuration of the sound data decoding apparatus according to a second exemplary embodiment of the present invention.
Figure 4:
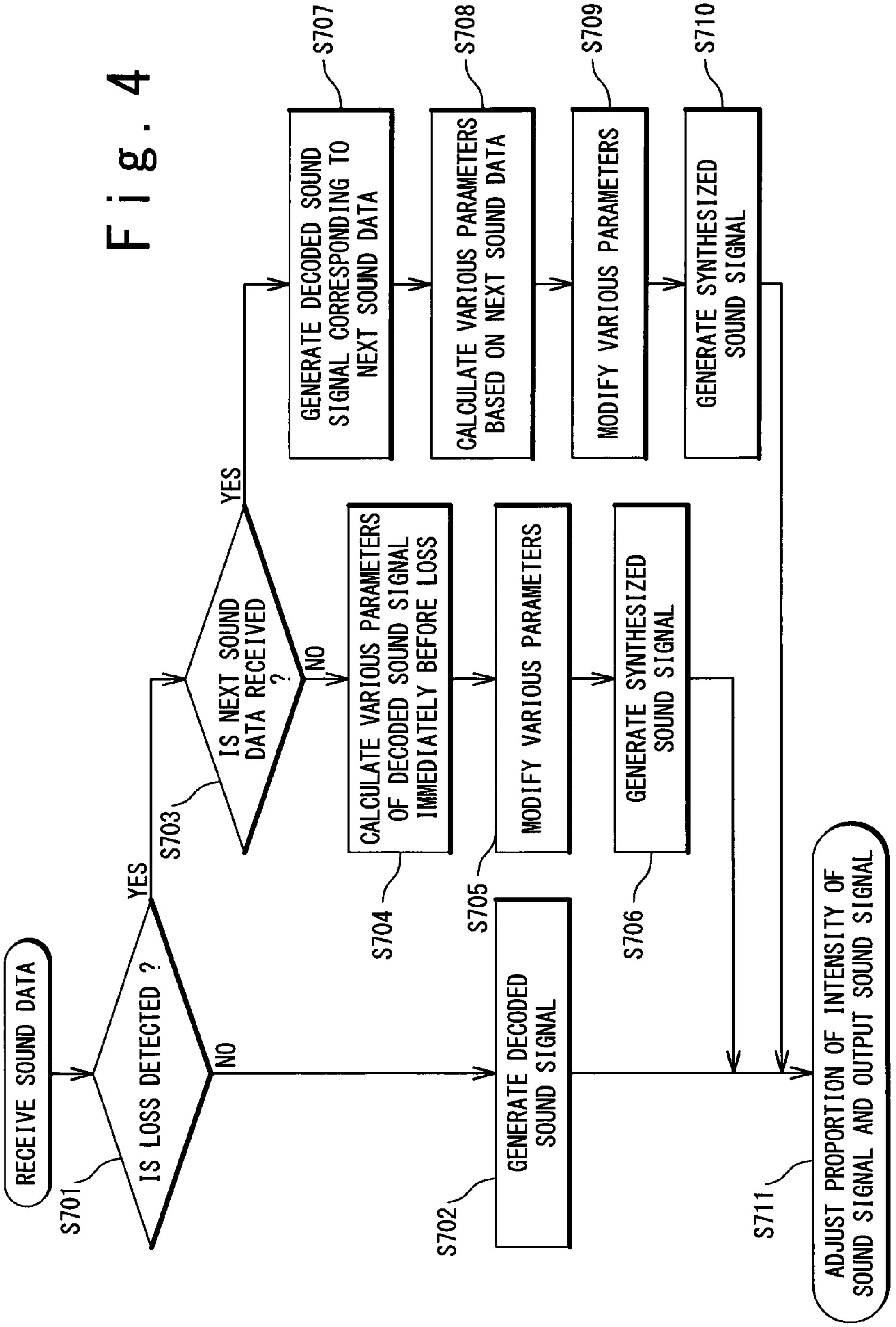
FIG. 4 is a flow chart showing an operation of the sound data decoding apparatus according to the second exemplary embodiment.

FIG. 3 shows a configuration of a sound data decoding apparatus for sound data coded by a waveform coding method such as the G.711 method. The sound data decoding apparatus according to the second exemplary embodiment includes a loss detector 201, sound data decoder 202, sound data analyzer 203, parameter modifying section 204, sound synthesizing section 205 and sound signal outputting section 206. The operations of the sound data decoder 202, sound data analyzer 203, parameter modifying section 204 and sound synthesizing section 205 are same as those of the sound data decoder 102, sound data analyzer 103, parameter modifying section 104 and sound synthesizing section 105, respectively.

The loss detector 201 executes the same operation as the loss detector 101. When the loss detector 201 detects the loss in the sound data, the loss detector 201 detects whether the next sound data following the loss is received before the sound signal outputting section 206 outputs a sound signal to interpolate the loss portion. The loss detector 201 outputs the detection result to the sound data decoder 202, sound data analyzer 203, parameter modifying section 204 and sound signal outputting section 206.

The sound data analyzer 203 executes the same operation as the sound data analyzer 103. The sound data analyzer 203 generates the time-reversed signal of sound signal corresponding to the next sound data to the detected loss. The sound data analyzer 203 analyzes the time-reversed signal through the same procedures of the first exemplary embodiment to extract the spectral parameter, delay parameter, adaptive codebook gain, normalized residual signal or normalized residual signal gain and outputs them to the parameter modifying section 204.

The sound signal outputting section 206, based on the loss detection result outputted from the loss detector 201, outputs the decoded sound signal outputted from the sound data decoder 202 or a signal in which a first synthesized sound signal and time-reversed signal of a second synthesized sound signal are added such that the proportion of the first synthesized sound signal is higher at first and the proportion of the time-reversed signal is higher at last. The first synthesized sound signal is generated based on the parameter of the preceding sound data to the detected loss. The second synthesized sound signal is generated based on the parameter of the next sound data to the detected loss.

Next, an operation of the sound data decoding apparatus according to the second exemplary embodiment will be described with reference to FIG. 4.

At first, the loss detector 201 detects whether a loss sexists in the received sound data (Step S701). When the loss detector 201 does not detect the loss, the same operation as Step S602 is executed (Step S702).

When the loss detector 201 detects the loss, the loss detector 201 detects whether the next sound data following the loss is received before the sound signal outputting section 206 outputs the sound data to interpolate the loss portion (Step S703). When the next sound data is not received, the same operation as Steps S603 to S605 is executed (Steps S704 to S706). When the next sound data is received, the sound data decoder 202 decodes the next sound data (Step S707). The sound data analyzer 203 extracts the spectral parameter, delay parameter, adaptive codebook gain, normalized residual signal or normalized residual signal gain based on the decoded next sound data (Step S708). The parameter modifying section 204 modifies the spectral parameter, delay parameter, adaptive codebook gain, normalized residual signal or normalized residual signal gain or does not modify them based on the loss detection result (Step S709). In the modification, for example, a random number within ±1% of the parameter is added to the parameter. The sound synthesizing section 205 generates the synthesized sound signal by using these values (Step S710).

The sound signal outputting section 206, based on the loss detection result outputted from the loss detector 201, outputs the decoded sound signal outputted from the sound data decoder 202 or the signal in which the first synthesized sound signal and time-reversed signal of the second synthesized sound signal are added such that the proportion of the first synthesized sound signal is higher at first and the proportion of the time-reversed signal is higher at last (Step S711). The first synthesized sound signal is generated based on the parameter of the preceding sound data to the detected loss. The second synthesized sound signal is generated based on the parameter of the next sound data to the detected loss.

In VoIP (Voice over IP) which has rapidly spread in recent years, the received sound data are buffered to absorb the fluctuation of the time of arrival of the sound data. According to the second exemplary embodiment, the buffered next sound data to the loss is used to interpolate the loss portion of the sound data. Thus, the sound quality of the interpolation signal is improved.

A third exemplary embodiment will be described with reference to FIGS. 5 and 6. The present exemplary embodiment relates to the decoding of the sound data coded through the CELP method. In the present exemplary embodiment, as described with respect to the second exemplary embodiment, when a loss in the sound data is detected and the next sound data following the loss is received before a first sound data decoder 302 outputs the sound signal to interpolate the loss, the information of the next sound data is used to generate the sound signal corresponding to the sound data of the loss.

Figure 5:
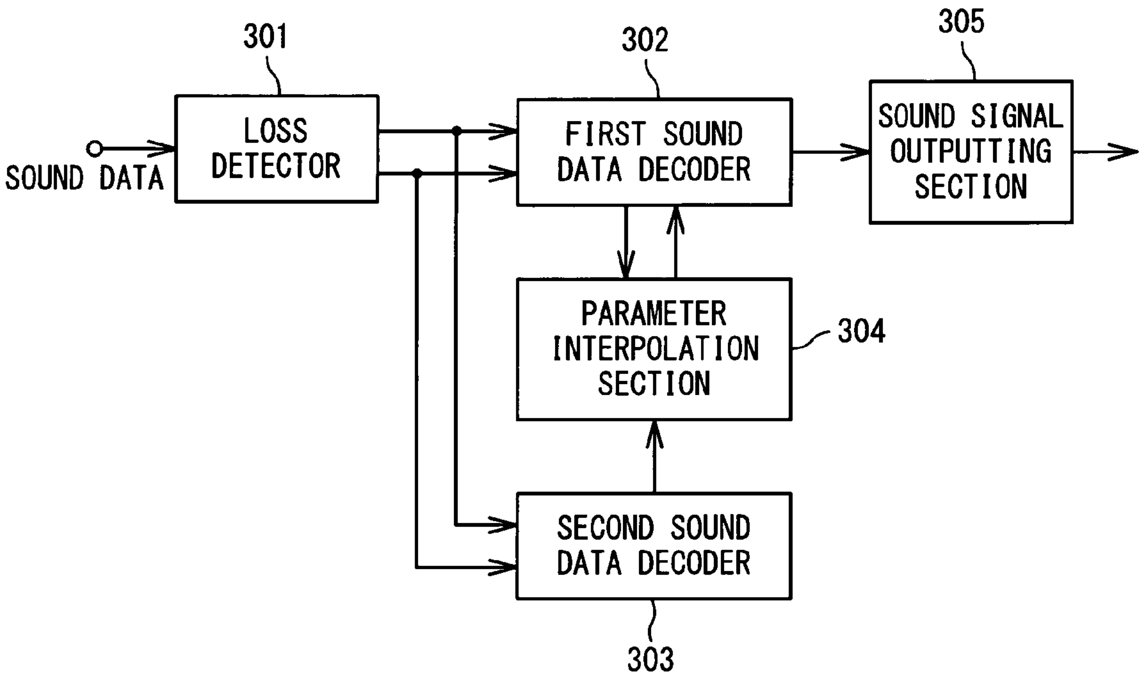
FIG. 5 is a schematic diagram showing a configuration of the sound data decoding apparatus according to a third exemplary embodiment of the present invention.
Figure 6:
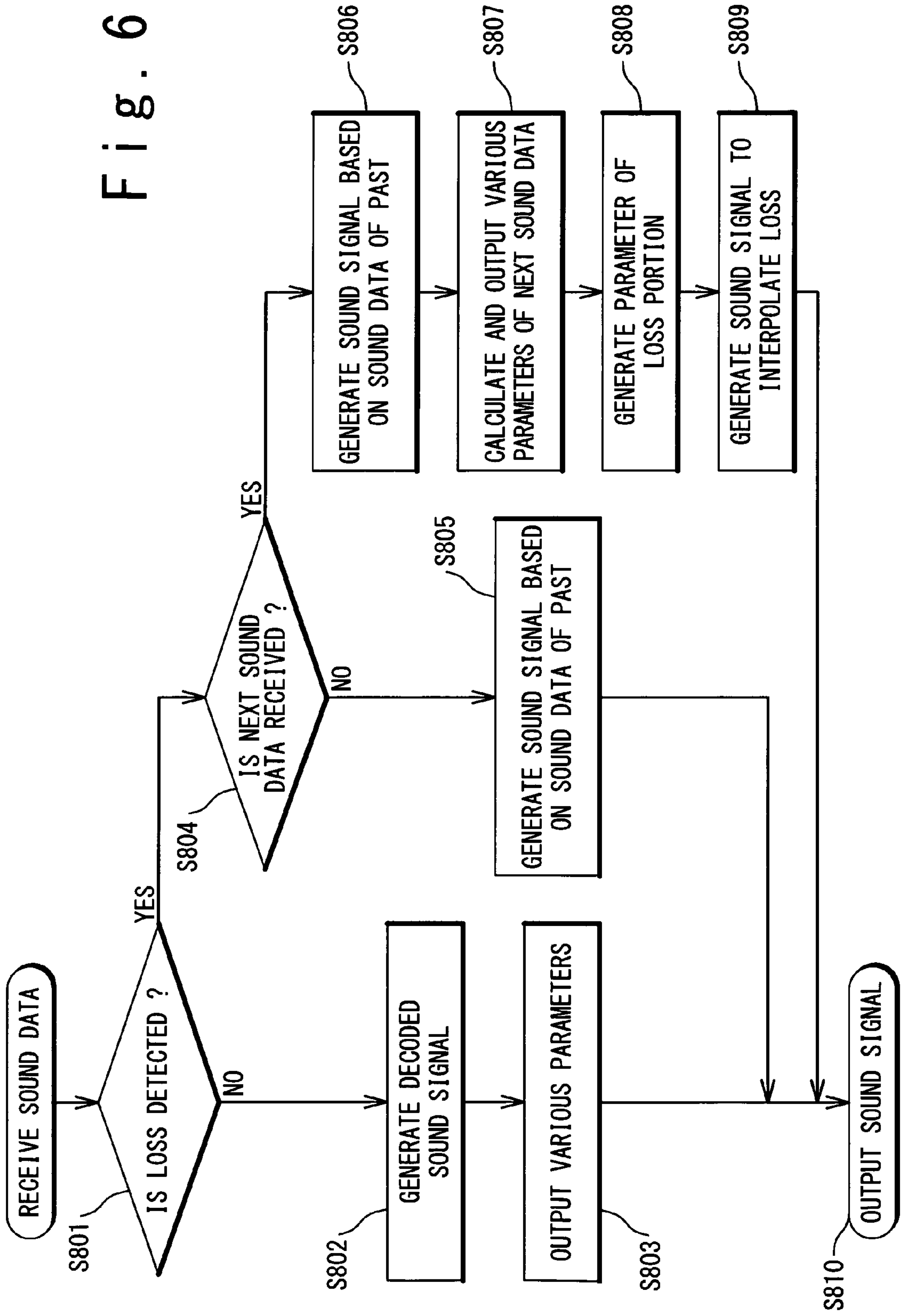
FIG. 6 is a flow chart showing an operation of the sound data decoding apparatus according to the third exemplary embodiment.

FIG. 5 shows a configuration of sound data decoding apparatus for the sound data coded through the CELP method. The sound data decoding apparatus according to the third exemplary embodiment includes a loss detector 301, first sound data decoder 302, parameter interpolation section 304, second sound data decoder 303 and sound data outputting section 305.

The loss detector 301 outputs the received sound data to the first sound data decoder 302 and second sound data decoder 303. The loss detector 301 detects whether a loss exists in the received sound data. When the loss is detected, the loss detector 301 detects whether the next sound data is received before the first sound data decoder 302 outputs a sound signal to interpolate the loss portion, and outputs the detection result to the first sound data decoder 302 and second sound data decoder 303.

When the loss is not detected, the first sound data decoder 302 decodes the sound data outputted from the loss detector 301, outputs the resulting decoded sound signal to the sound signal outputting section 305 and outputs a spectral parameter, delay parameter, adaptive codebook gain, normalized residual signal or normalized residual signal gain of the decoding to the parameter interpolation section 303. When the loss is detected and the next sound data is not received, the first sound data decoder 302 generates a sound signal to interpolate the loss portion by using information of sound data of the past. The first sound data decoder 302 generates the sound signal by using the method disclosed in Japanese Laid Open Patent Application (JP-P2002-268697A). The first sound data decoder 302 generates a sound signal corresponding to the sound data of the loss by using parameter outputted from the parameter interpolation section 304 and outputs the sound signal to the sound signal outputting section 305.

When the loss is detected and the next sound data is received before the first sound data decoder 302 outputs the sound signal to interpolate the loss portion, the second sound data decoder 303 generates a sound signal corresponding to the sound data of the loss by using information of sound data of the past. The second sound data decoder 303 decodes the next sound data by using the generated sound signal, extracts the spectral parameter, delay parameter, adaptive codebook gain, normalized residual signal or normalized residual signal gain used for the decoding and outputs them to the parameter interpolation section 304.

The parameter interpolation section 304 generates the parameters corresponding to the sound data of the loss by using the parameters from the first sound data decoder 302 and parameters from the second sound data decoder 303 and outputs the generated parameters to the first sound data decoder 302.

The sound data outputting section 305 outputs the decoded sound signal outputted from the first sound data decoder 302.

Next, an operation of the sound data decoding apparatus according to the third exemplary embodiment will be described with reference to FIG. 6.

At first the loss detector 301 detects whether a loss exists in the received sound data (Step S801). When the loss does not exist, the first sound data decoder 302 decodes the sound data outputted from the loss detector 301 and outputs the spectral parameter, delay parameter, adaptive codebook gain, normalized residual signal or normalized residual signal gain of the decoding to the parameter interpolation section 304 (Steps 802 and 803).

When the loss exists, the loss detector 301 detects whether the next sound data following the loss is received before the first sound data decoder 302 outputs the sound signal to interpolate the loss portion (Step S804). When the next sound data is not received, the first sound data decoder 302 generates the sound signal to interpolate the loss portion by using information of sound data of the past (Step S805).

When the next sound data is received, the second data decoder 303 generates the sound signal corresponding to the sound data of the loss by using information of sound data of the past (Step S806). The second data decoder 303 decodes the next sound data by using the generated sound signal, generates the spectral parameter, delay parameter, adaptive codebook gain, normalized residual signal or normalized residual signal gain of the decoding and outputs them to the parameter interpolation section 304 (Step S807). Next, the parameter interpolation section 304 generates the parameters corresponding to the sound data of the loss by using the parameters outputted from the first sound data decoding section 302 and the parameters outputted from the second data decoding section 303 (Step S808). The first sound data decoder 302 generates the sound signal corresponding to the sound data of the loss by using the parameters generated by the parameter interpolation section 304 and outputs the generated sound signal to the sound signal outputting section 305 (Step S809).

The first sound data decoder 302 outputs the sound signal generated in each case to the sound signal outputting section 305 and the sound signal outputting section 305 outputs the decoded sound signal (Step S810).

In VoIP (Voice over IP) which has rapidly spread in recent years, the received sound data are buffered to absorb the fluctuation of the time of arrival of the sound data. According to the third exemplary embodiment, when the sound data is coded through the CELP method, the buffered next sound data to the loss is used to interpolate the loss portion of the sound data. Thus, the sound quality of the interpolation signal is improved.

A fourth exemplary embodiment will be described with reference to FIGS. 7 and 8. When an interpolation signal is used for the loss of sound data coded through the CELP method, although the loss portion can be interpolated, the sound quality of sound data received after the loss portion may be deteriorated. Since the interpolation signal is not generated based on the correct sound data. Therefore, in the fourth exemplary embodiment, when the delayed sound data of the loss portion arrives at late timing after the interpolation sound signal corresponding to the loss portion is outputted, the delayed sound data is used to improve the sound quality of the sound signal corresponding to the next sound data to the loss. The operation of the third exemplary embodiment is also executed in the fourth exemplary embodiment.

Figure 7:
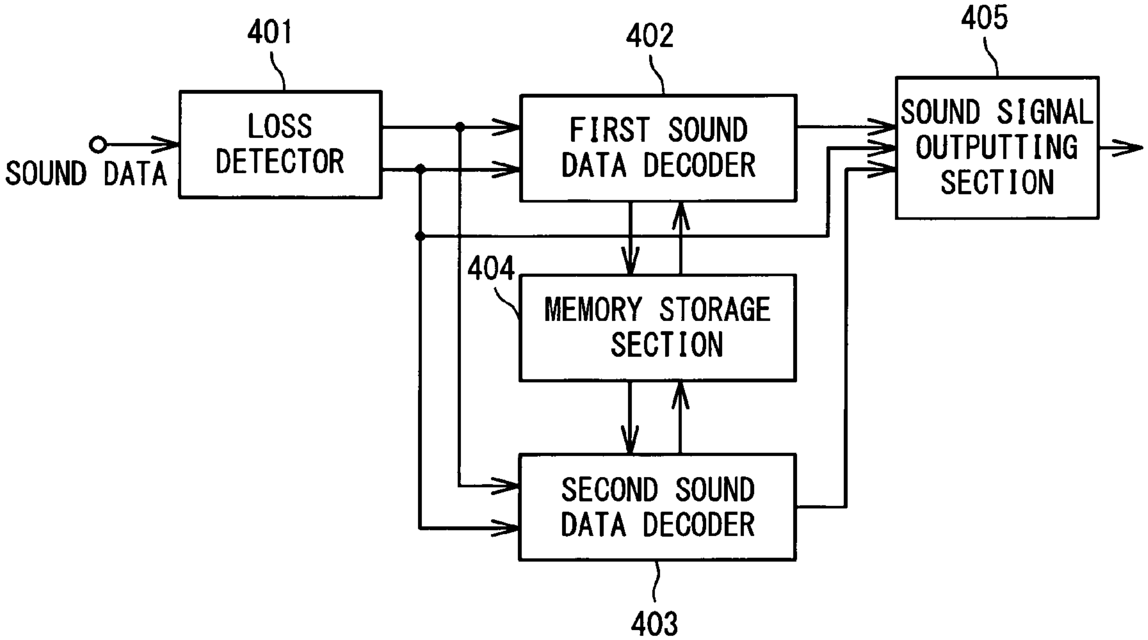
FIG. 7 is a schematic diagram showing a configuration of the sound data decoding apparatus according to a fourth exemplary embodiment of the present invention.
Figure 8:
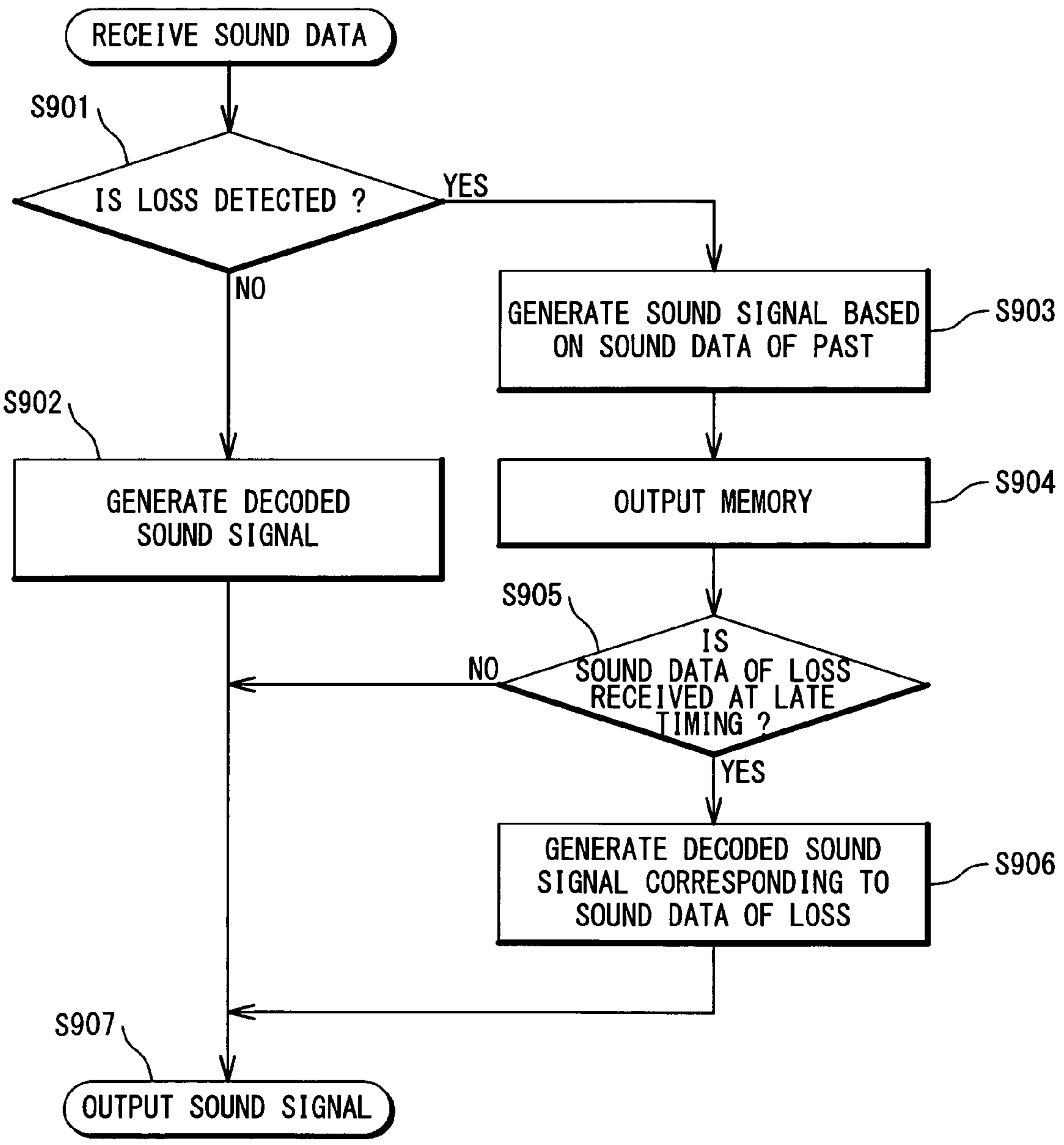
FIG. 8 is a flow chart showing operation of the sound data decoding apparatus according to the fourth exemplary embodiment.

FIG. 7 shows a configuration of sound data decoding apparatus for sound data coded through the CELP method. The sound data decoding apparatus according to the fourth exemplary embodiment includes a loss detector 401, first sound data decoder 402, second sound data decoder 403, memory storage section 404 and sound signal outputting section 405.

The loss detector 401 outputs the received sound data to the first sound data decoder 402 and second sound data decoder 403. The loss detector 401 detects whether a loss is exists in the received sound data. When the loss is detected, the loss detector 401 detects whether the next sound data is received and outputs the detection result to the first sound data decoder 402, second sound data decoder 403 and sound signal outputting section 405. The loss detector 401 detects whether the sound data of the loss is received at late timing.

When the loss is not detected, the first sound data decoder 402 decodes the sound data outputted from the loss detector 401. When the loss is detected, the first sound data decoder 402 generates a sound signal by using information of sound data of the past and outputs the generated sound signal to the sound signal outputting section 405. The first sound decoder 402 generates the sound signal by using the method disclosed in Japanese Laid Open Patent Application (JP-P2002-268697A). The first sound data decoder 402 outputs a memory of synthesizing filter or the like to the memory storage section 404.

When the sound data of the loss portion arrives at late timing, the second sound data decoder 403 decodes the sound data of delayed arrival by using the memory of synthesizing filter or the like of the packet immediately before the detected loss. The memory is stored in the memory storage section 404. The second data decoder 403 outputs the resulting decoded signal to the sound signal outputting section 405.

The sound signal outputting section 405 outputs the decoded sound signal outputted from the first sound data decoder 402, the decoded sound signal outputted from the second sound data decoder 403 or a sound signal in which these two signals are added in a predetermined proportion, based on the loss detection result outputted from the loss detector 401.

Next, an operation of the sound data decoding apparatus according to the fourth exemplary embodiment will be described with reference to FIG. 8.

At first, the sound data decoding apparatus executes the operation of steps S801 to S810 to outputs the sound signal to interpolate the sound data of the loss. When the sound signal is generated based on the sound data of the past in Steps S805 and S806, the memory of synthesizing filter or the like is outputted to the memory storage section 404 (Steps S903 and S904). The loss detector 401 detects whether the sound data of the loss is received at late timing (Step S905). When the loss detector 401 does not detect the delayed reception, the sound signal generated as described in the third exemplary embodiment is outputted. When the loss detector 401 detects the delayed reception, the second sound data decoder 403 decodes the sound data of delayed arrival by using the memory of synthesizing filter or the like of the packet immediately before the detected loss (Step S906). The memory is stored in the memory storage section 404.

The sound signal outputting section 405 outputs the decoded sound signal outputted from the first sound data decoder 402, the decoded sound signal outputted from the second sound data decoder 403 or the sound signal in which these two signals are added in the predetermined proportion, based on the loss detection result outputted from the loss detector 401 (Step S907). More specifically, when the loss is detected and the sound data arrives at late timing, the sound signal outputting section 405 outputs the sound signal, in which the decoded sound signals outputted from the first sound data decoder 402 and the second sound data decoder 403 are added, as a sound signal corresponding to the next sound data to the sound data of the loss. At first, the sound signal outputting section 405 sets the proportion of the decoded sound signal outputted from the first sound data decoder 402 large. The sound signal outputting section 405 gradually increases the proportion of the decoded sound signal outputted from the second sound data decoder 403 in the course of time.

According to the fourth exemplary embodiment, the memory of synthesizing filter or the like is rewritten by using the sound data of the loss portion, which arrives at late timing, thus, the correct decoded sound signal can be generated. The correct sound signal is not outputted directly but the sound signal is outputted in which the two signals are added in the predetermined proportion. Thus, a discontinuity of the sound is prevented. Even when the interpolation signal is used for the loss portion, the sound quality of the sound signals after the interpolation signal is improved by rewriting the memory of the synthesizing filter or the like based on the sound data of the loss portion of delayed arrival to generate the decoded sound signal.

The fourth exemplary embodiment has been described as a modification of the third exemplary embodiment. The fourth exemplary embodiment may be a modification of another exemplary embodiment.

A sound data converting apparatus according to a fifth exemplary embodiment will be described with reference to FIGS. 9 and 10.

Figure 9:
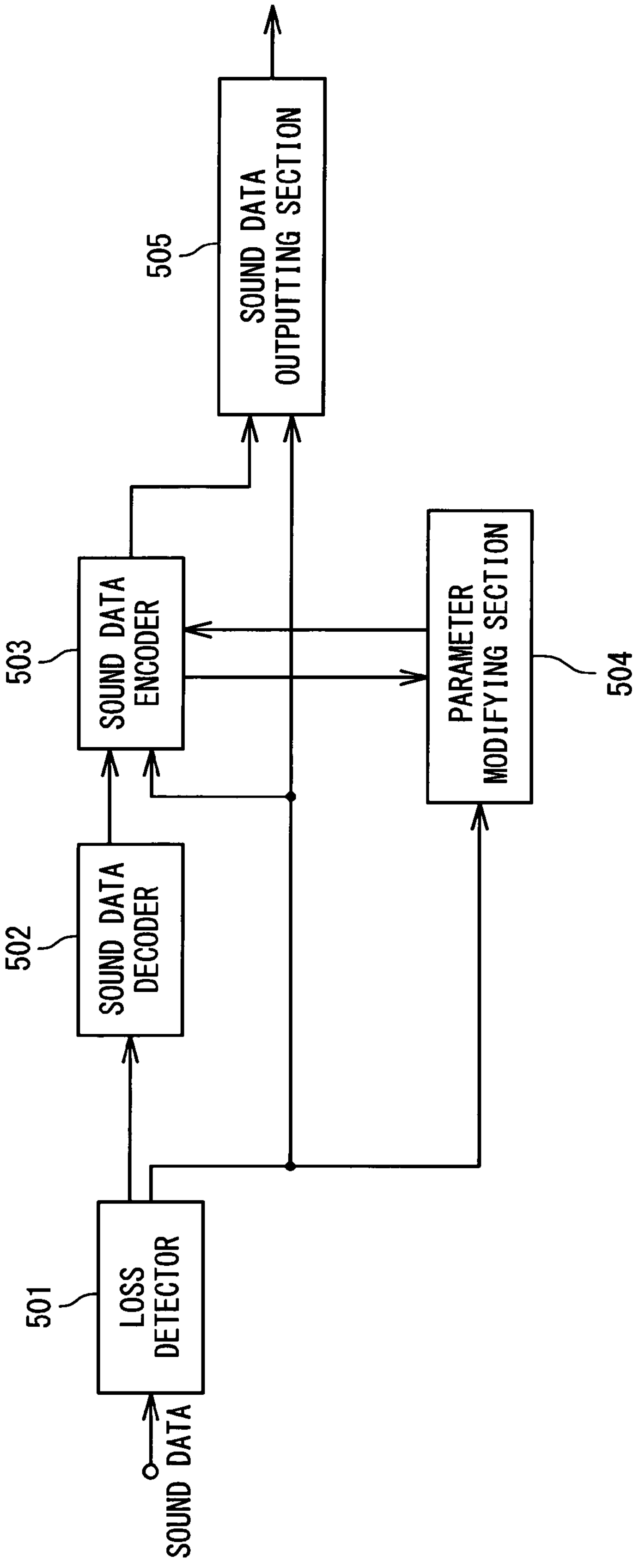
FIG. 9 is a schematic diagram showing a configuration of the sound data decoding apparatus according to a fifth exemplary embodiment of the present invention.
Figure 10:
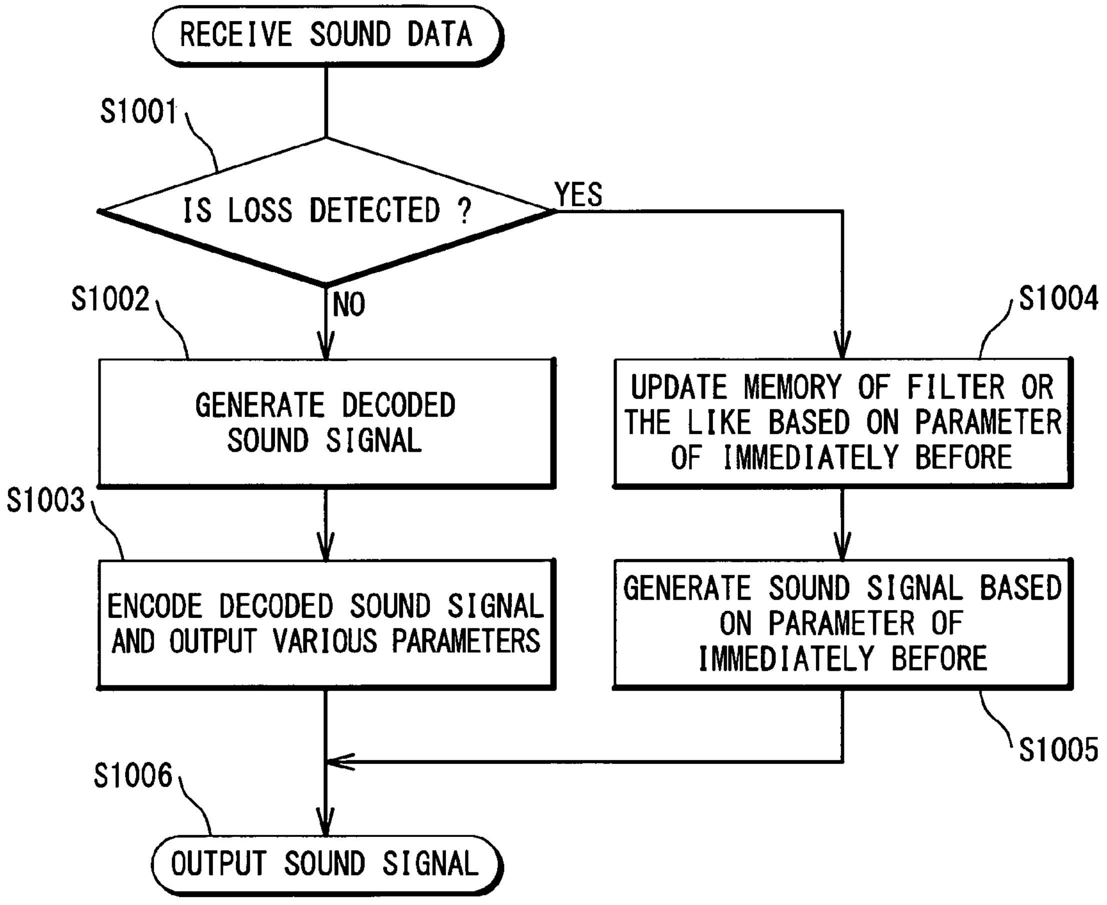
FIG. 10 is a flow chart showing an operation of the sound data decoding apparatus according to the fifth exemplary embodiment.

FIG. 9 shows a configuration of the sound data converting apparatus which converts a sound signal coded in accordance with a sound coding method into a sound signal coded in accordance with another sound coding method. For example, the sound data converting apparatus converts a sound data coded in accordance with a waveform coding method such as the G.711 method into a sound data coded in accordance with the CELP method. The sound data converting apparatus according to the fifth exemplary embodiment includes a loss detector 501, sound data decoder 502, sound data encoder 503, parameter modifying section 504 and sound data outputting section 505.

The loss detector 501 outputs the received sound data to the sound data decoder 502. The loss detector 501 detects whether a loss is exists in the received sound data and outputs the detection result to sound data decoder 502, sound data encoder 503, parameter modifying section 504 and sound data outputting section 505.

When the loss is not detected, the sound data decoder 502 decodes the sound data outputted from the loss detector 501 and outputs the resulting decoded sound signal to the sound data encoder 503.

When the loss is not detected, the sound data encoder 503 codes the decoded sound signal outputted from the sound data decoder 502 and outputs the resulting coded sound data to the sound data outputting section 505. The sound data encoder 503 outputs the spectral parameter, delay parameter, adaptive codebook gain, normalized residual signal or normalized residual signal gain as parameter of the coding to the parameter modifying section 504. When the loss is detected, the sound data encoder 503 receives a parameter outputted from the parameter modifying section 504. The sound data encoder 503 holds a filter (not shown) used for parameter extraction and codes the parameter received from the parameter modifying section 504 to generate a sound data. In this time, the sound data encoder 503 updates the memory of the filter or the like. When the coded parameter value does not agree with the value outputted from the parameter modifying section 504 due to a quantization error caused in the coding, the sound data encoder 503 makes a selection such that the coded parameter value is most approximate to the value outputted from the parameter modifying section 504. The sound data encoder 503, in the generating sound data, updates the memory (not shown) had by the filter used for parameter extraction or the like to avoid the inconsistency between the memory and a memory of a filter held by a wireless communication apparatus as a counter part of communication. The sound data encoder 503 outputs the generated sound data to sound data outputting section 505.

The parameter modifying section 504 receives and saves the spectral parameter, delay parameter, adaptive codebook gain, normalized residual signal or normalized residual signal gain as parameter of the coding from the sound data encoder 503. The parameter modifying section 504 executes a predetermined modification on the holding parameter corresponding to the sound data before the detected loss or does not execute the modification. The parameter modifying section 504 outputs the modified parameter or not-modified parameter to the sound data encoder 503 based on the loss detection result outputted from the loss detector 501.

The sound data outputting section 505 outputs the sound data received from the sound data encoder 503 based on the loss detection result received from the loss detector 501.

Next, the sound data converting apparatus according to the fifth embodiment will be described with respect to FIG. 10.

At first, the loss detector 501 detects whether a loss exists in the received sound data (Step S1001). When the loss detector 501 does not detect the loss, the sound data decoder 502 generates the decoded sound signal based on the received sound data (Step S1002). The sound data encoder 503 codes the decoded sound signal and outputs the spectral parameter, delay parameter, adaptive codebook gain, normalized residual signal or normalized residual signal gain as parameters in the coding (Step S1003).

When the loss detector 501 detects the loss, the parameter modifying section 504 outputs the holding parameters before the loss to the sound data encoder 503 without modification or outputs the holding parameters after the predetermined modification. The sound data encoder 503, upon receiving the parameters, updates the memory had by the filter used for parameter extraction (Step S1004). The sound data encoder 503 generates the sound signal based on the parameters immediately before the loss (Step S1005).

The sound data outputting section 505 outputs the sound signal received from the sound data encoder 503 (Step S1006).

According to the fifth exemplary embodiment, for example, in an apparatus for converting data such as gateway or the like, the interpolation signal corresponding to the loss in the sound data is not generated through the waveform coding method and the loss portion is interpolated by using the parameter or the like, thus, the amount of calculation can be reduced.

In the fifth exemplary embodiment, the conversion of the sound data coded in accordance with the waveform coding method such as the G.711 method into the sound data coded in accordance with the CELP method has been described. It is also possible that the sound data coded in accordance with a CELP method is converted into a sound data coded in accordance with another CELP method.

Some apparatuses according to the above exemplary embodiments, for example, can be summarized as follows.

A sound data decoding apparatus based on a waveform coding method includes a loss detector, sound data decoder, sound data analyzer, parameter modifying section, sound synthesizing section and sound signal outputting section. The loss detector is configured to detect a loss in a sound data and to detect whether a sound frame following the loss is received before the sound signal outputting section outputs a sound signal to interpolate the loss. The sound data decoder is configured to decode the sound frame to generate a decoded sound signal. The sound data analyzer is configured to perform a time reversal on the decoded sound signal to extract a parameter. The parameter modifying section is configured to perform a predetermined modification on the parameter. The sound synthesizing section is configured to generate a synthesized sound signal by using the modified parameter.

A sound data decoding apparatus based on a CELP (Code-Excited Linear Prediction) method includes a loss detector, first sound data decoder, second sound data decoder, parameter interpolation section and sound signal outputting section. The loss detector is configured to detect whether a loss exists in a sound data and to detect whether a sound frame following the loss is received before the first sound data decoder outputs a first sound signal. The first sound data decoder is configured to decode the sound data to generate a sound signal based on a result of the detection of loss. The second sound data decoder is configured to generate a sound signal corresponding to the sound frame based on the result of the detection of loss. The parameter interpolation section is configured to use a first parameter and second parameter to generate a third parameter corresponding to the loss and to output the third parameter to the first sound data decoder. The sound signal outputting section is configured to output a sound data outputted from the first sound data decoder. The first sound data decoder is configured to decode the sound data to generate a sound signal and to output the first parameter extracted in the decoding to the parameter interpolation section when the loss is not detected. The first sound data decoder is configured to use a preceding portion of the sound data to the loss to generate the first sound signal corresponding to the loss when the loss is detected. The second sound data decoder is configured to use the preceding portion to generate a second sound signal corresponding to the loss, to use the second sound signal to decode the sound frame and to output the second parameter extracted in the decoding to the parameter interpolation section when the loss is detected and the sound frame is detected before the first sound data decoder outputs the first sound signal. The first sound data decoder is configured to uses the third parameter outputted from the parameter interpolation section to generate a third sound signal corresponding to the loss.

A sound data decoding apparatus for outputting an interpolation signal to interpolate a loss in a sound data based on a CELP method is provided. The sound data decoding apparatus includes a loss detector, sound data decoder and sound signal outputting section. The loss detector is configured to detect the loss and a delayed reception of a loss portion of the sound data. The loss portion corresponds to the loss. The sound data decoder is configured to decode the loss portion to generate a decoded sound signal by using a preceding portion of the sound data to the loss. The preceding portion is stored in a memory storage section. The sound signal outputting section is configured to output a sound signal including the decoded sound signal such that a proportion of an intensity of the decoded sound signal to an intensity of the sound signal changes.

A sound data converting apparatus for converting a first sound data coded in accordance with a first sound coding method into a second sound data coded in accordance with a second sound coding method is provided. The sound data converting apparatus includes a loss detector, sound data decoder, sound data encoder and parameter modifying section. The loss detector is configured to detect a loss in the first sound data. The sound data decoder is configured to decode the first sound data to generate a decoded sound signal. The sound data encoder includes a filter for extracting a parameter and is configured to code the decoded sound signal based on the second sound coding method. The parameter modifying section is configured to receive the parameter from the sound data encoder and to hold the parameter. The parameter modifying section is configured to outputs the parameter to the sound data encoder after a predetermined modification on the parameter or without the predetermined modification based on a result of the detection of loss. The sound data encoder is configured to code the decoded sound signal based on the second sound coding method and to output the parameter extracted in the coding to the parameter modifying section when the loss is not detected. The sound data encoder is configured to generate a sound signal based on the parameter outputted from the parameter modifying section and to update a memory had by the filter when the loss is detected.

It is preferable that the first sound coding method is a waveform coding method and the second sound coding method is a CELP method.

Each of the parameters is preferably a spectral parameter, delay parameter, adaptive codebook gain, normalized residual signal or normalized residual signal gain.

Those skilled in the art can easily enforce various modifications of the above exemplary embodiments. The present invention is not limited to the above exemplary embodiments and can be interpreted as widest as possible based on the claims and equivalents.

The invention claimed is:

1. A sound data decoding apparatus comprising:

a loss detector configured to detect whether a loss exists in a sound data;

a sound data decoder configured to decode said sound data to generate a first decoded sound signal;

a sound data analyzer configured to extract a first parameter from said first decoded sound signal;

a parameter modifying section configured to modify said first parameter based on a result of said detection of said loss;

a sound synthesizing section configured to generate a first synthesized sound signal by using said modified first parameter; and a sound signal outputting section, wherein said loss detector is configured to detect whether a sound frame following said loss is received before said sound signal outputting section outputs a sound signal for interpolating said loss, said sound data decoder is configured to decode said sound frame to generate a second decoded sound signal, said sound data analyzer is configured to perform a time reversal on said second decoded sound signal to extract a second parameter, said parameter modifying section is configured to perform a predetermined modification on said second parameter, and said sound synthesizing section is configured to generate a second synthesized sound signal by using said modified second parameter.

2. The sound data decoding apparatus according to claim 1, further comprising:

a sound signal outputting section configured to output a sound signal including said first decoded sound signal and said first synthesized sound signal such that a proportion of an intensity of said first decoded sound signal to an intensity of said first synthesized sound signal changes, based on said result of said detection of said loss.

3. The sound data decoding apparatus according to claim 1, wherein said first parameter is a spectral parameter, delay parameter, adaptive codebook gain, normalized residual signal or normalized residual signal gain.

4. The sound data decoding apparatus according to claim 1, wherein said sound signal outputting section is configured to output said first decoded sound signal and to output a sound signal including said first synthesized sound signal and said second synthesized sound signal such that a proportion of an intensity of said first synthesized sound signal to an intensity of said second synthesized sound signal changes, based on said result of said detection of said loss.

5. A sound data decoding apparatus comprising:

means for detecting whether a loss exists in a sound data;

means for decoding said sound data to generate a first decoded sound signal;

means for extracting a first parameter from said first decoded sound signal;

means for modifying said first parameter based on a result of said detection of said loss;

means for generating a first synthesized sound signal by using said modified first parameter;

means for outputting a sound signal for interpolating said loss;

means for detecting whether a sound frame following said loss is received before said sound signal for interpolating said loss is outputted;

means for decoding said sound frame to generate a second decoded sound signal;

means for performing a time reversal on said second decoded sound signal to extract a second parameter;

means for performing a predetermined modification on said second parameter; and means for generating a second synthesized sound signal by using said modified second parameter.

6. The sound data decoding apparatus according to claim 5, further comprising:

means for outputting a sound signal including said first decoded sound signal and said first synthesized sound signal such that a proportion of an intensity of said first decoded sound signal to an intensity of said first synthesized sound signal changes, based on said result of said detection of said loss.

7. The sound data decoding apparatus according to claim 5, further comprising:

means for outputting said first decoded sound signal based on said result of said detection of said loss; and means for outputting a sound signal including said first synthesized sound signal and said second synthesized sound signal such that a proportion of an intensity of said first synthesized sound signal to an intensity of said second synthesized sound signal changes, based on said result of said detection of said loss.

8. The sound data decoding apparatus according to claim 5, wherein said first parameter is a spectral parameter, delay parameter, adaptive codebook gain, normalized residual signal or normalized residual signal gain.

9. A sound data decoding method comprising:

detecting whether a loss exists in a sound data;

decoding said sound data to generate a first decoded sound signal;

extracting a first parameter from said first decoded sound signal;

modifying said first parameter based on a result of said detection of said loss;

generating a first synthesized sound signal by using said modified first parameter;

detecting whether a sound frame following said loss is received before a signal for interpolating said loss is outputted;

decoding said sound frame to generate a second decoded sound signal;

performing a time reversal on said second decoded sound signal to extract a second parameter;

performing a predetermined modification on said second parameter; and generating a second synthesized sound signal by using said modified second parameter.

10. The sound data decoding method according to claim 9, further comprising:

outputting a sound signal including said first decoded sound signal and said first synthesized sound signal such that a proportion of an intensity of said first decoded sound signal to an intensity of said first synthesized sound signal changes, based on said result of said detection of said loss.

11. The sound data decoding method according to claim 9, further comprising:

outputting said first decoded sound signal based on said result of said detection of said loss; and outputting a sound signal including said first synthesized sound signal and said second synthesized sound signal such that a proportion of an intensity of said first synthesized sound signal to an intensity of said second synthesized sound signal changes, based on said result of said detection of said loss.

12. The sound data decoding method according to claim 9, wherein said first parameter is a spectral parameter, delay parameter, adaptive codebook gain, normalized residual signal or normalized residual signal gain.

* * * * *